United States Patent
Savanur

(10) Patent No.: US 10,896,114 B2
(45) Date of Patent: Jan. 19, 2021

(54) MACHINE LEARNING ERROR PREDICTION IN STORAGE ARRAYS

(71) Applicant: SEAGATE TECHNOLOGY LLC, Cupertino, CA (US)

(72) Inventor: Sunil Savanur, Maharashtra (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 170 days.

(21) Appl. No.: 15/987,775

(22) Filed: May 23, 2018

(65) Prior Publication Data

US 2019/0361784 A1    Nov. 28, 2019

(51) Int. Cl.
| | | |
|---|---|---|
| G06F 11/00 | (2006.01) | |
| G06F 11/34 | (2006.01) | |
| G06F 11/30 | (2006.01) | |
| G06K 9/62 | (2006.01) | |
| G06N 3/04 | (2006.01) | |
| G06N 20/00 | (2019.01) | |

(52) U.S. Cl.
CPC ...... *G06F 11/3447* (2013.01); *G06F 11/3034* (2013.01); *G06K 9/6269* (2013.01); *G06K 9/6282* (2013.01); *G06N 3/04* (2013.01); *G06N 20/00* (2019.01)

(58) Field of Classification Search
CPC ............... G06F 11/079; G06F 11/0793; G06F 11/3034; G06F 11/3447
See application file for complete search history.

(56) References Cited

U.S. PATENT DOCUMENTS

| | | | |
|---|---|---|---|
| 6,574,754 B1 | 6/2003 | Smith | |
| 9,542,296 B1* | 1/2017 | Engers | G06F 11/3452 |
| 9,652,318 B2* | 5/2017 | Namkoong | G06F 11/0793 |
| 9,886,338 B1* | 2/2018 | Khokhar | G06F 11/34 |
| 9,916,194 B2* | 3/2018 | Pang | G06N 5/00 |
| 10,157,105 B2* | 12/2018 | Chen | G06F 11/1451 |
| 10,176,032 B2* | 1/2019 | Horrell | G06F 11/0751 |
| 10,216,558 B1* | 2/2019 | Gaber | G06F 11/0727 |
| 10,268,553 B2 | 4/2019 | Eggert et al. | |
| 10,423,522 B2* | 9/2019 | Bergen | G06F 11/3688 |
| 10,437,702 B2* | 10/2019 | Kalech | G06F 11/0793 |
| 10,469,511 B2* | 11/2019 | Vasseur | H04L 43/024 |
| 2005/0060618 A1 | 3/2005 | Guha | |
| 2007/0174720 A1 | 7/2007 | Kubo et al. | |
| 2012/0191631 A1* | 7/2012 | Breckenridge | G06N 20/00 706/12 |
| 2014/0351642 A1* | 11/2014 | Bates | G06F 11/0709 714/26 |
| 2015/0317589 A1* | 11/2015 | Anderson | G06Q 10/0631 705/7.25 |

(Continued)

*Primary Examiner* — Elmira Mehrmanesh
(74) *Attorney, Agent, or Firm* — Hall Estill Attorneys at Law

(57) ABSTRACT

Systems and methods for machine learning error prediction in storage arrays are described. In one embodiment, the method includes monitoring events of at least a first storage drive array, analyzing the monitored events using machine learning, identifying failure events based at least in part on the analysis and operating a prediction model engine to predict potential errors in storage drive arrays, the prediction model engine being built based at least in part on the analysis of the monitored events or the identifying of the failure events, or both.

19 Claims, 7 Drawing Sheets

(56) References Cited

U.S. PATENT DOCUMENTS

| | | | |
|---|---|---|---|
| 2015/0379430 A1* | 12/2015 | Dirac | G06N 20/00 |
| | | | 706/12 |
| 2016/0088006 A1* | 3/2016 | Gupta | H04L 43/08 |
| | | | 726/23 |
| 2016/0379465 A1* | 12/2016 | McElhinney | G06F 11/0751 |
| | | | 340/502 |
| 2018/0012145 A1* | 1/2018 | Maurya | G06N 5/022 |
| 2018/0222043 A1* | 8/2018 | Trovero | H04L 69/40 |
| 2018/0314573 A1* | 11/2018 | Chang | G06F 11/3024 |
| 2019/0138939 A1* | 5/2019 | Devaraju | G06N 20/00 |
| 2019/0266070 A1* | 8/2019 | Bhandarkar | G06F 11/079 |
| 2020/0057689 A1* | 2/2020 | Farahat | G06Q 30/0283 |

\* cited by examiner

MACHINE LEARNING ERROR PREDICTION IN STORAGE ARRAYS

SUMMARY

The present disclosure is directed to methods and systems for using machine learning to predict errors in storage arrays. In some embodiments, the present systems and methods may use a telemetry data predictive model in conjunction with machine learning to predict errors in storage arrays.

A system for machine learning error prediction in storage arrays is described. In one embodiment, the computing device may include one or more processors, memory in electronic communication with the one or more processors, and instructions stored in the memory, the instructions being executable by the one or more processors to perform the steps of monitoring events of at least a first storage drive array, analyzing the monitored events using machine learning, identifying failure events based at least in part on the analysis, and operating a prediction model engine to predict potential errors in storage drive arrays, the prediction model engine being built based at least in part on the analysis of the monitored events or the identifying of the failure events, or both.

In some cases, the machine learning may include at least one of Support Vector Machines, Bayes Theorem, Regression Analysis, Artificial Neural Network or Decision Tree Classifiers, or any combination thereof. In some cases, analyzing the monitored events of the first storage drive array may include feeding a first portion of the monitored events into a training set to train the prediction model engine, feeding at least a portion of an output of the prediction model engine back into the training set, and feeding a second portion of the monitored events into a test set.

In some embodiments, the instructions executed by the one or more processors may cause the one or more processors to perform the steps of analyzing the training set using the machine learning, passing the test set and an output of the analyzing of the training set to the prediction model engine, and using the prediction model engine to analyze one or more events of at least a second storage drive array.

In some embodiments, the instructions may be executed by the one or more processors to cause the one or more processors to identify at least one of one or more causes of an identified failure based at least in part on the analysis, a remedy for the identified failure based at least in part on the analysis, or a pattern of events associated with the identified failure based at least in part on the analysis, or any combination thereof.

In some cases, the output of the analysis may include at least one of the identified failure, the one or more causes of the identified failure, the identified remedy for the identified failure, or the identified pattern of events associated with the identified failure, or any combination thereof.

In some embodiments, the instructions may be executed by the one or more processors to cause the one or more processors to use the prediction model engine to analyze one or more events of a second storage drive array and predict one or more errors in the second storage drive array based at least in part on the analysis of the one or more events of the second storage drive array.

In some embodiments, based at least in part on the analysis of the one or more events of the second storage drive array, the instructions may be executed by the one or more processors to cause the one or more processors to predict at least one of a failure of the second storage drive array, a probable root cause of the predicted failure, or a probable remedy for the predicted failure, or any combination thereof.

In some embodiments, the instructions may be executed by the one or more processors to cause the one or more processors to generate a notification indicating the predicted failure. In some cases, the notification further indicates at least one of the probable root cause of the predicted failure or the probable remedy for the predicted failure, or both.

In some cases, the first storage drive array and second storage drive array each may include at least one storage enclosure enclosing multiple storage drives. In some embodiments, the identified failure events may include at least one of hardware component failures, software code execution failures, data access errors, data read errors, data write errors, or any combination thereof.

A method for machine learning error prediction in storage arrays is also described. In one embodiment, the method may include monitoring events of at least a first storage drive array, analyzing the monitored events using machine learning, identifying failure events based at least in part on the analysis and operating a prediction model engine to predict potential errors in storage drive arrays, the prediction model engine being built based at least in part on the analysis of the monitored events or the identifying of the failure events, or both.

A computer-program product to improve a computer system is also described. In one embodiment, the computer-program product may include a non-transitory computer-readable medium storing instructions thereon, the instructions being executable by one or more processors to perform the steps of monitoring events of at least a first storage drive array, analyzing the monitored events using machine learning, identifying failure events based at least in part on the analysis, building a prediction model engine based at least in part on the analysis of the monitored events or the identifying of the failure events, or both, using the prediction model engine to analyze one or more events of a second storage drive array, and predicting one or more errors in the second storage drive array based at least in part on the analysis of the one or more events of the second storage drive array.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
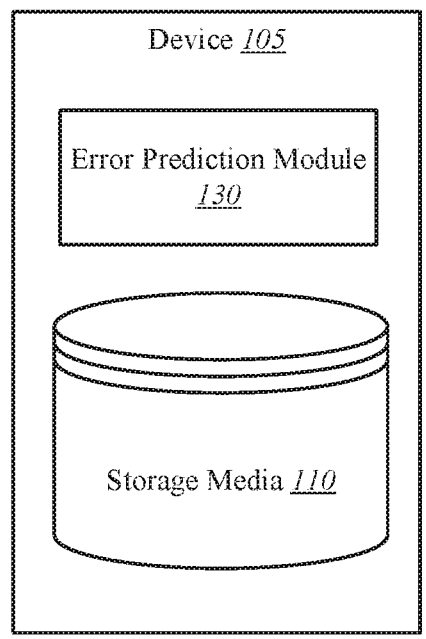
FIG. 1 is a block diagram of an example of a system in accordance with various embodiments.

The following relates generally to machine learning error prediction in storage arrays. Machine learning may include analyzing monitored events using a statistical process that is iteratively improved upon by any combination of classifications, decisions, and predictions made without human intervention. Failures in storage drive arrays and/or storage enclosures may cause a severe data loss with an impact measured in the millions of dollars. Some of the failures may be manifested as software issues at least initially. Currently, there is no way to predict at least some of these failures. Conventional approaches to detect such failures include analyzing logs reactively and attempting to recreate the indicated failure. The conventional approach is relatively time consuming and often comes too late to remedy the failure.

The present systems and methods include building an error-prediction model of storage drive arrays using historical failure data. The failure data collected from logs may be analyzed and categorized. These categorized observations may be fed into a prediction model engine. The prediction engine model may be configured to supervise the learning process and arrive at predictions of potential errors. The prediction engine model then uses this profile to understand and predict future failure cases.

The present systems and methods include collecting data, parsing logs, and uploading observations to a central server for analysis. In some cases, logs from one or more storage drive arrays may be collected periodically. The storage drive arrays may be located in a single location or at multiple remote locations. In some cases, the present systems and methods may analyze logs for certain failures or patterns with certain keywords such as exception, trap, signal, watchdog, reset, crash, restart, etc. These observations may be categorized into buckets along with component, timestamp, probable root cause and probable remedial action.

The present systems and methods may include a server and/or cloud service. The cloud service may include one or more cloud servers and/or cloud storage. In one example, a cloud server may perform analysis on data uploaded to the cloud server. In some cases, the server and/or cloud service may be owned by the same entity that performs the operations described herein. In some cases, the server and/or cloud service may be owned by the same entity that manufactures the storage drive arrays. Additionally or alternatively, the present systems and methods may be performed by a first entity and at least some of the storage drive arrays may be manufactured by a second entity distinct from the first entity.

In some embodiments, the server and/or cloud service may host software code and/or software applications. For example, the serve and/or cloud service may host prediction and/or analytics software applications. In some cases, the present systems and methods may use machine learning algorithms. In some embodiments, the machine learning algorithms may include at least one of Support Vector Machines, Bayes Theorem, Artificial Neural Networks, or Decision Tree Classifiers, or any combination thereof. At least a portion of an output from the machine learning algorithm may be fed into a prediction model engine. In some cases, the prediction model engine may use logic regression and/or pattern classification for determining possible predictions such as probable-root-cause and probable-action-resolution. In some cases, the prediction may be determined in key-value pairs.

In some embodiments, the present systems and methods may analyze logs. In some cases, the analysis may include parsing the logs from telemetry data and uploading at least a portion of the parsed data to the server and/or cloud service. For example, the present systems and methods may analyze the parsed data, identify predetermined elements and/or types of data in the parsed data, and send at least the predetermined elements and/or types of data to the cloud for further analysis. In some cases, the present systems and methods may include identifying metadata in the parsed data and uploading at least the identified metadata to the cloud. In some cases, the metadata may include at least one of data type, file name, file size, file type, machine identifier, user identifier, system data and/or control data (e.g., data other than user data), or any combination thereof. In some cases, the machine identifier may identify a machine associated with the data (e.g., a machine used to create and/or modify the data, etc.). Similarly, the user identifier may identify a user associated with the data (e.g., a user that creates and/or modifies the data, etc.).

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiment, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include error prediction module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, device 105 may include a wired and/or a wireless connection to an external database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Error prediction module 130 may detect a storage device related event such as an event that affects the operation of a storage device (e.g., storage drive, storage server, storage enclosure, storage drive array, etc.). In some cases, error prediction module 130 may detect events that adversely affect the operation of a storage device. In some embodiments, error prediction module 130 may store the detected event in a log that includes multiple detected events. The log may include detected events from a single storage device or events from two or more storage devices. In some embodiments, error prediction module 130 may search the log of detected events to identify frequently occurring event patterns. For example, error prediction module 130 may identify an event pattern such as event A occurring first, then event B after event A, and then event C after event B occurring frequently among all the detected events stored in the log. In some cases, error prediction module 130 may use machine learning to learn the pattern of events and use the learned patterns to implement a predictive engine model to detect probable errors in monitored storage devices.

Figure 2:
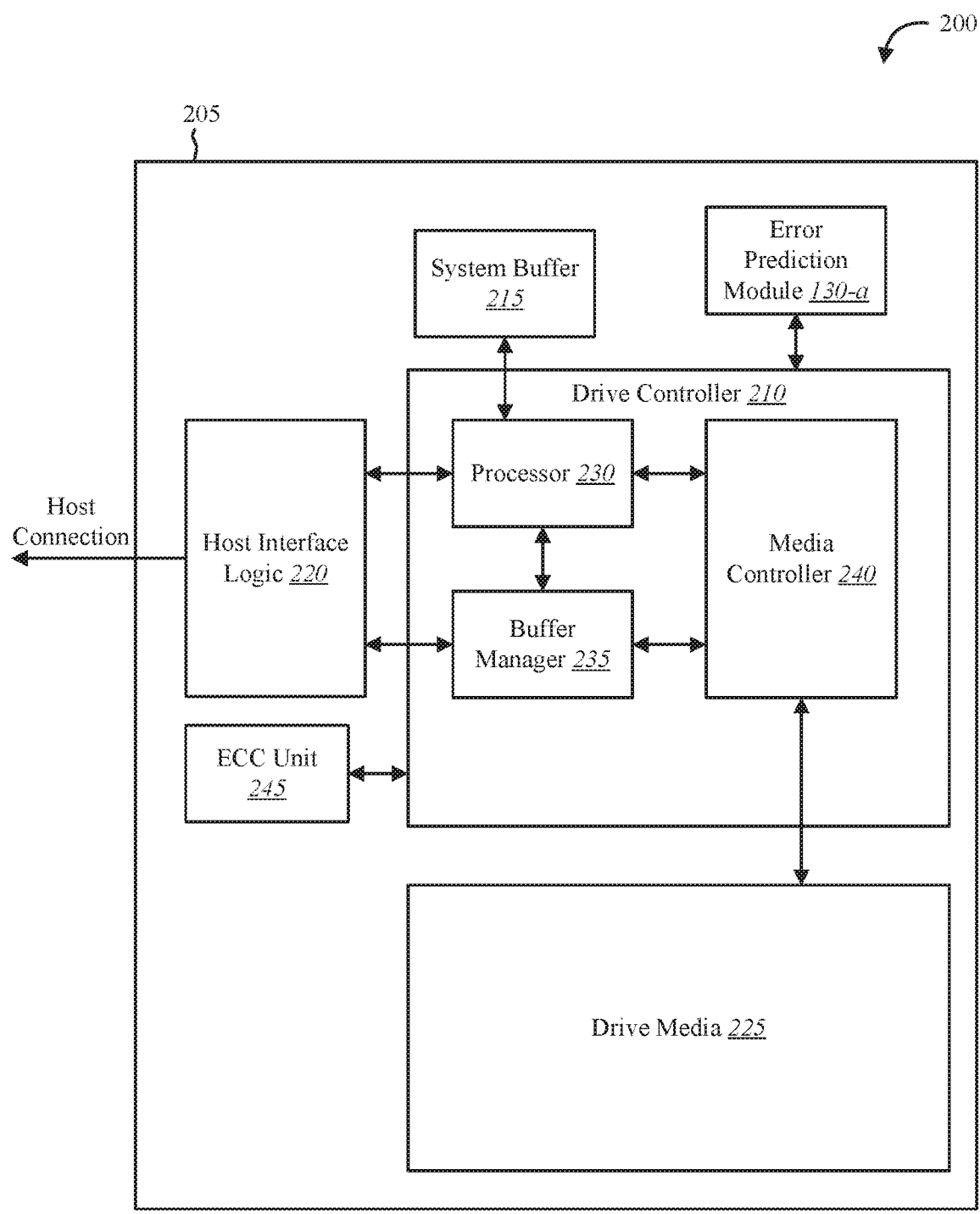
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and error prediction module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The drive controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, error correction control (ECC) unit 245 may perform error correction on data stored in drive media 225.

In some embodiments, error prediction module 130-a may include at least one of one or more processors, one or more memory devices, one or more storage devices, instructions executable by one or more processors stored in one or more memory devices and/or storage devices, or any combination thereof. Although depicted outside of drive controller 210, in some embodiments, error prediction module 130-a may include software, firmware, and/or hardware located within drive controller 210 and/or operated in conjunction with drive controller 210. For example, error prediction module 130-a may include at least a portion of processor 230, buffer manager 235, and/or media controller 240. In one example, error prediction module 130-a may include one or more instructions executed by processor 230, buffer manager 235, and/or media controller 240.

Figure 3:
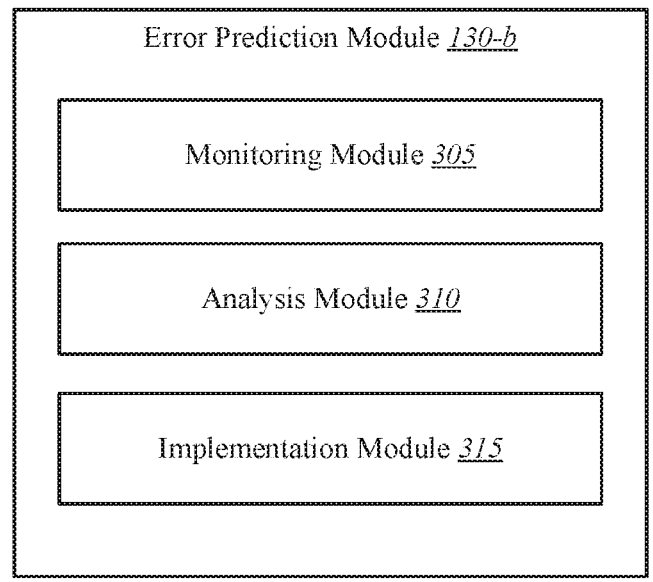
FIG. 3 shows a block diagram of one or more modules in accordance with various aspects of this disclosure.

FIG. 3 shows a block diagram of error prediction module 130-b. The error prediction module 130-b may include one or more processors, memory, and/or one or more storage devices. The error prediction module 130-b may include monitoring module 305, analysis module 310, and implementation module 315. The error prediction module 130-b may be one example of error prediction module 130 of FIGS. 1 and/or 2. Each of these components may be in communication with each other.

In one embodiment, the error prediction module 130 may be configured for error prediction in storage systems. In some cases, the error prediction module 130 may include at least one of hardware, firmware, or software, or any combination thereof. For example, error prediction module 130 may include one or more processors and/or memory in electronic communication with the one or more processors. In some cases, the memory may store computer executable instructions that when executed by the one or more processors cause the one or more processors to perform at least on operation described herein.

In one embodiment, monitoring module 305 may be configured to monitor events of at least a first storage drive array. In some cases, the first storage drive array and second storage drive array may each include at least one storage enclosure enclosing multiple storage drives.

In one embodiment, analysis module 310 may be configured to analyze the monitored events using machine learning. In some cases, the machine learning may include at least one of Support Vector Machines, Bayes Theorem, Artificial Neural Network or Decision Tree Classifiers, or any combination thereof.

In some embodiments, an output of the analysis performed by analysis module 310 may include at least one of an identified failure, one or more causes of the identified failure, an identified remedy for the identified failure, or an identified pattern of events associated with the identified failure, or any combination thereof.

In one embodiment, implementation module 315 may be configured to identify failure events based at least in part on the analysis. In some cases, implementation module 315 may be configured to identify one or more remedies used to fix an identified failure. In some cases, an identified failure event may include at least one of hardware component failures, software code execution failures, data access errors, data read errors, data write errors, or any combination thereof.

In some embodiments, implementation module 315 may be configured to operate a prediction model engine to predict potential errors in storage drive arrays. In some cases, the prediction model engine may be built based at least in part on the analysis of the monitored events or the identifying of the failure events, or both.

In some cases, analyzing the monitored events of the first storage drive array may include feeding a first portion of the monitored events into a training set to train the prediction model engine, feeding at least a portion of an output of the prediction model engine back into the training set, and feeding a second portion of the monitored events into a test set.

In some embodiments, implementation module 315 may be configured to identify at least one of one or more causes of an identified failure based at least in part on the analysis, a remedy for the identified failure based at least in part on the analysis, or a pattern of events associated with the identified failure based at least in part on the analysis, or any combination thereof.

In some embodiments, implementation module 315 may be configured to use the prediction model engine to analyze, in conjunction with analysis module 310, one or more events of a second storage drive array. In some embodiments, implementation module 315 may be configured to predict one or more errors in the second storage drive array based at least in part on a result of the analysis of the one or more events of the second storage drive array.

In some embodiments, based at least in part on the analysis of the one or more events of the second storage drive array, implementation module 315 may be configured to predict at least one of a failure of the second storage drive array, a probable root cause of the predicted failure, or a probable remedy for the predicted failure, or any combination thereof.

In some embodiments, implementation module 315 may be configured to generate a notification indicating the predicted failure. In some cases, the notification may further indicate at least one of the probable root cause of the predicted failure or the probable remedy for the predicted failure, or both.

Figure 4:
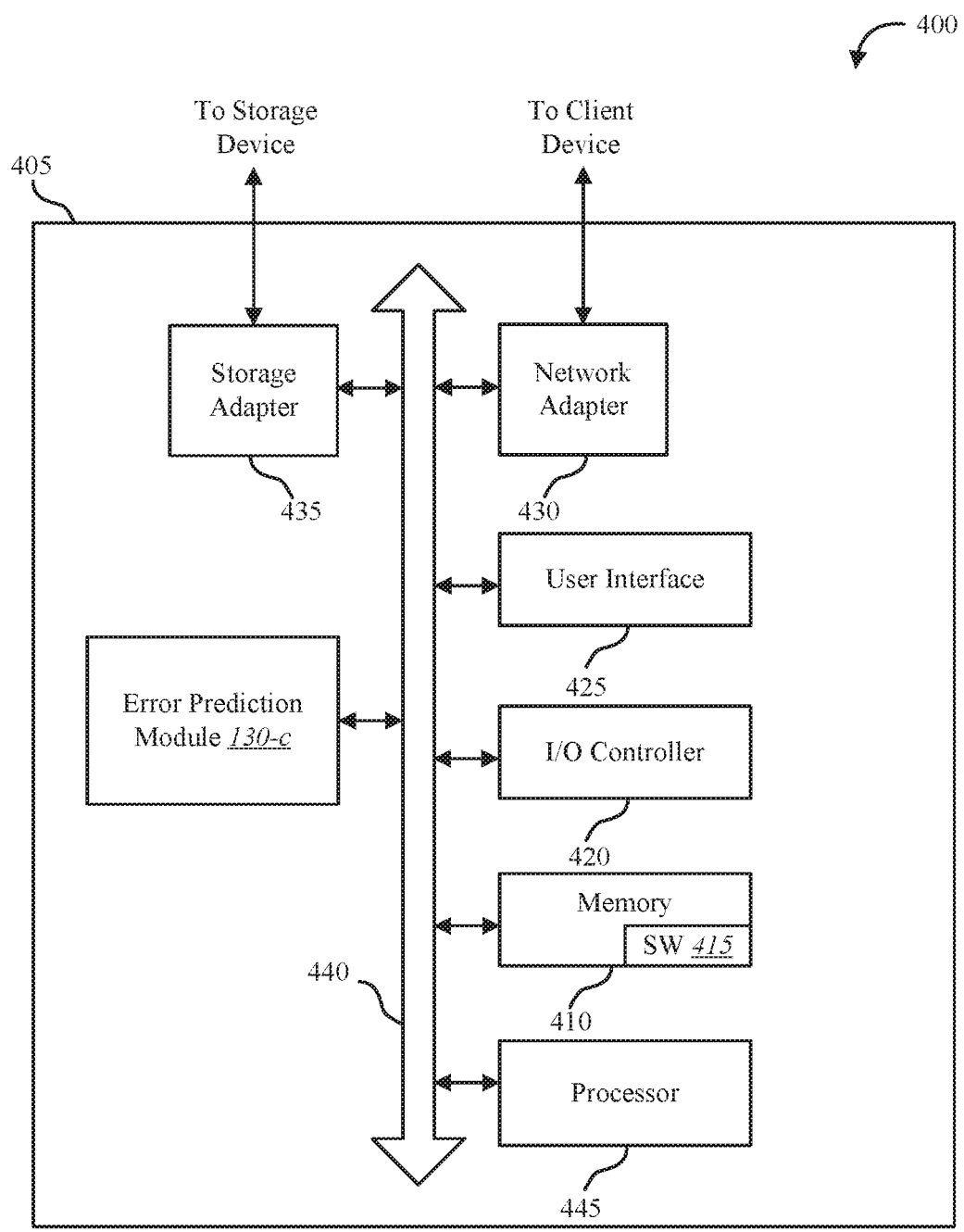
FIG. 4 shows a diagram of a system in accordance with various aspects of this disclosure.

FIG. 4 shows a system 400 for machine learning error prediction in storage arrays, in accordance with various examples. System 400 may include an apparatus 405, which may be an example of any one of device 105 of FIG. 1 and/or apparatus 205 of FIG. 2.

Apparatus 405 may include components for bi-directional voice and data communications including components for transmitting communications and components for receiving communications. For example, apparatus 405 may communicate bi-directionally with one or more storage devices and/or client systems. This bi-directional communication may be direct (apparatus 405 communicating directly with a storage system, for example) and/or indirect (apparatus 405 communicating indirectly with a client device through a server, for example).

Apparatus 405 may also include a processor module 445, and memory 410 (including software/firmware code (SW) 415), an input/output controller module 420, a user interface module 425, a network adapter 430, and a storage adapter 435. The software/firmware code 415 may be one example of a software application executing on apparatus 405. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 405 may provide a connection using wireless techniques, including digital cellular telephone connection, Cellular Digital Packet Data (CDPD) connection, digital satellite data connection, and/or another connection. The apparatus 405 may include error prediction module 130-c, which may perform the functions described above for the error prediction module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including Wi-Fi and/or near field wireless), WMAN (WiMAX) for mobile communications, antennas for Wireless Personal Area Network (WPAN) applications (including RFID and UWB), or any combination thereof.

One or more buses 440 may allow data communication between one or more elements of apparatus 405 such as processor module 445, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 445 to perform various functions described in this disclosure. Alternatively, the software/firmware code 415 may not be directly executable by the processor module 445 but may cause a computer (when compiled and executed, for example) to perform functions described herein. Alternatively, the computer-readable, computer-executable software/firmware code 415 may not be directly executable by the processor module 445, but may be configured to cause a computer, when compiled and executed, to perform functions described herein. The processor module 445 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the error prediction module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 405 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 405 to access one or more data storage devices such as storage media 110. The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter.

Figure 5:
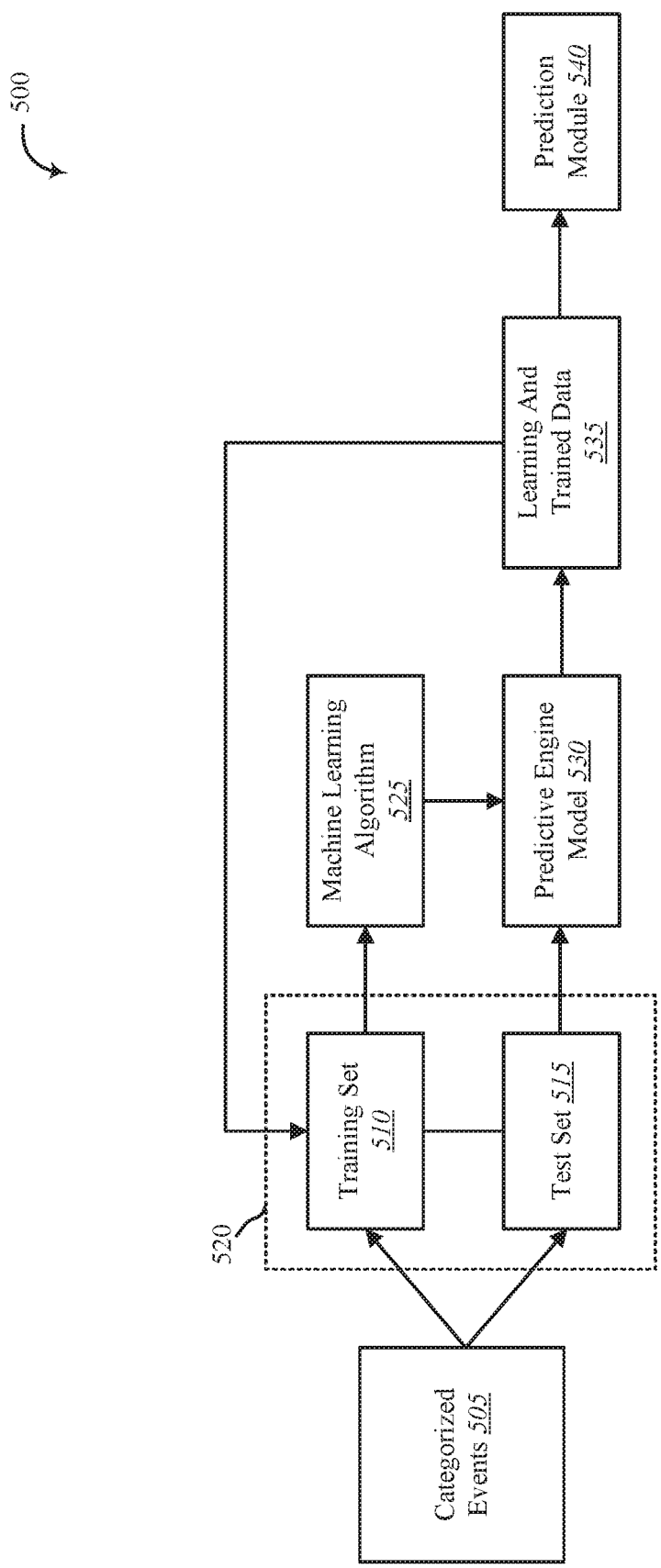
FIG. 5 shows one embodiment of an environment in accordance with various aspects of this disclosure.

FIG. 5 shows an environment 500 for machine learning error prediction in storage arrays, in accordance with various examples. At least one aspect of environment 500 may be implemented in conjunction with device 105 of FIG. 1, apparatus 205 of FIG. 2, and/or error prediction module 130 depicted in FIGS. 1, 2, 3, and/or 4.

In one embodiment, environment 500 illustrates a high level view of machine learning and a prediction model engine of the present systems and methods. As illustrated, the environment 500 may include categorized events 505, training set 510, test set 515, machine learning algorithm 525, prediction model engine 530, learning and trained data 535, and prediction module 540.

In some embodiments, the categorized events 505 may include events from telemetry data. In some cases, the telemetry data may include data from logs generated and populated with data by one or more storage drive arrays. In some cases, the categorized events 505 may include data categorized based on a parsing of the logs from the one or more storage drive arrays.

In one embodiment, the categorized events 505 may be divided into training set 510 and test set 515. In some cases, the categorized events 505 may be split 50/50 where 50% of the categorized events 505 goes to training set 510 and 50% of the categorized events 505 goes to test set 515. Alternatively, more or less than 50% of categorized events 505 may go to training set 510 and less or more than 50% of categorized events 505 may go to test set 515. As one example, 40% of categorized events 505 may go to training set 510 and 60% of categorized events 505 may go to test set 515. In another example, 70% of categorized events 505 may go to training set 510 and 30% of categorized events 505 may go to test set 515.

In one embodiment, the data in training set 510 and test set 515 may include a complete set 520 of the categorized events 505. Alternatively, training set 510 and test set 515 may include less than 100% of categorized events 505. In some embodiments, categorized events 505 may be randomly split between training set 510 and test set 515. In one example, categorized events 505 may be divided between training set 510 and test set 515 using a k-fold cross validation method and/or normalization methods.

In some embodiments, error prediction module 130 may perform one or more operations described of environment 500. For example, error prediction module 130 may parse the telemetry data and categorize it into categorized events 505. Additionally or alternatively, error prediction module 130 may divide categorized events 505 into training set 510 and test set 515. In some embodiments, error prediction module 130 may randomly divide at least a portion of categorized events 505 into training set 510 and test set 515. In one example, error prediction module 130 may randomly divide each event in categorized events 505 to training set 510 or test set 515 on an individual event basis. For example, each event in categorized events 505 may have a 50/50 chance of going to training set 510 or test set 515. In some cases, error prediction module 130 may randomly divide a group of two or more events into training set 510 or test set 515.

In some embodiments, error prediction module 130 may feed data from training set 510 to machine learning algorithm 525. In some cases, error prediction module 130 may analyze the data from training set 510 using machine learning algorithm 525 to learn event patterns from the analysis of the data from training set 510. For example, error prediction module 130 may use machine learning algorithm 525 to learn event patterns associated with hardware and/or software failures in storage drive arrays.

In some embodiments, error prediction module 130 may feed data from test set 515 to prediction model engine 530 (also sometimes referred to as a "predictive engine model"). Additionally or alternatively, error prediction module 130 may feed data from machine learning algorithm 525 to prediction model engine 530. In some embodiments, error prediction module 130 may feed data from prediction model engine 530 to learning and trained data 535.

In some cases, prediction model engine 530 may analyze the data from test set 515 and/or the data from machine learning algorithm 525 to predict a probable root cause of a failure associated with a storage drive array. Additionally or alternatively, prediction model engine 530 may analyze the data from test set 515 and/or the data from machine learning algorithm 525 to predict a probable remedial action to remedy a failure associated with a storage drive array. For example, error prediction module 130 may feed one or more predictions made by prediction model engine 530 to learning and trained data 535. In some embodiments, error prediction module 130 may feed at least a portion of data from learning and trained data 535 back to training set 510 as feedback. Additionally or alternatively, error prediction module 130 may feed one or more predictions to prediction module 540. In some cases, prediction module 540 may generate a notification regarding one or more predetermined predictions. In some examples, prediction module 540 may send the notification to one or more designated recipients such as an administrator of an affected storage drive array.

Figure 6:
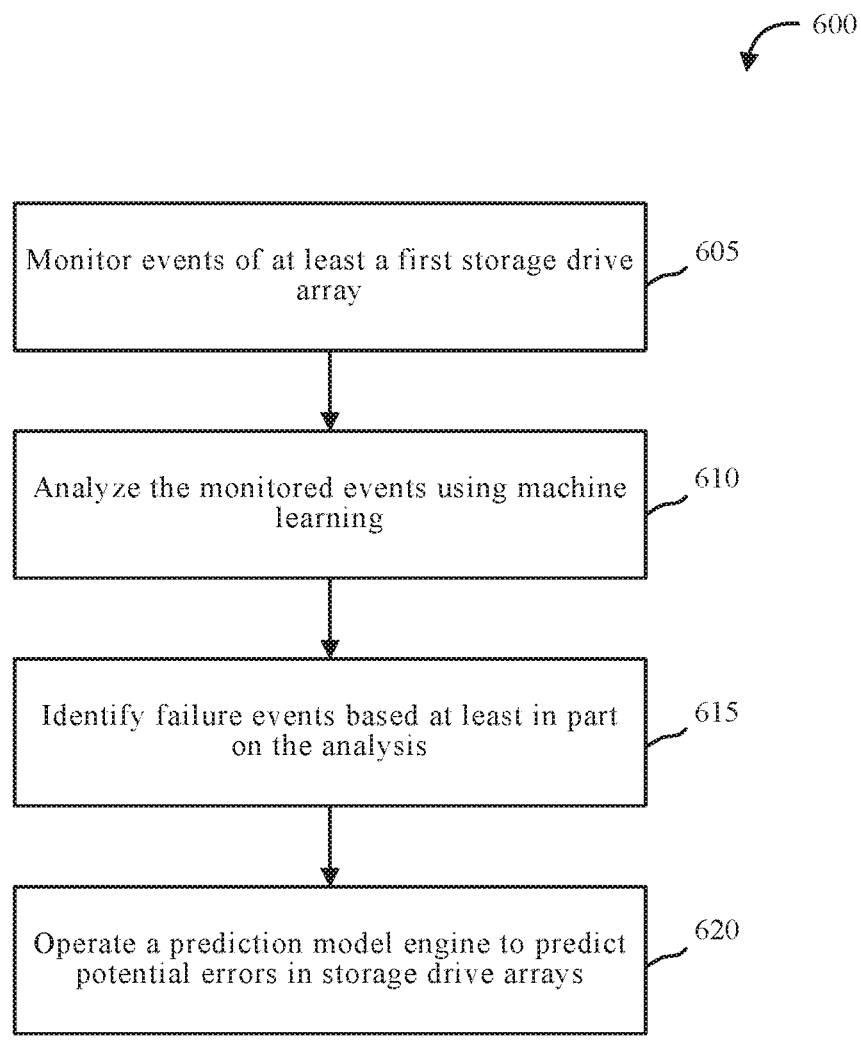
FIG. 6 is a flow chart illustrating an example of a method in accordance with various aspects of this disclosure.

FIG. 6 is a flow chart illustrating an example of a method 600 for machine learning error prediction in storage arrays, in accordance with various aspects of the present disclosure. One or more aspects of the method 600 may be implemented in conjunction with device 105 of FIG. 1, apparatus 205 of FIG. 2, and/or error prediction module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, method 600 may include monitoring events of at least a first storage drive array. At block 610, method 600 may include analyzing the monitored events using machine learning. At block 615, method 600 may include identifying failure events based at least in part on the analysis.

At block 620, method 600 may include operating a prediction model engine to predict potential errors in storage drive arrays. In some cases, the prediction model engine may be built based at least in part on the analysis of the monitored events or the identifying of the failure events, or both.

The operation(s) at block 605-620 may be performed using the error prediction module 130 described with reference to FIGS. 1-4 and/or another module. Thus, the method 600 may provide for machine learning error prediction in storage arrays. It should be noted that the method 600 is just one implementation and that the operations of the method 600 may be rearranged, omitted, and/or otherwise modified such that other implementations are possible and contemplated.

Figure 7:
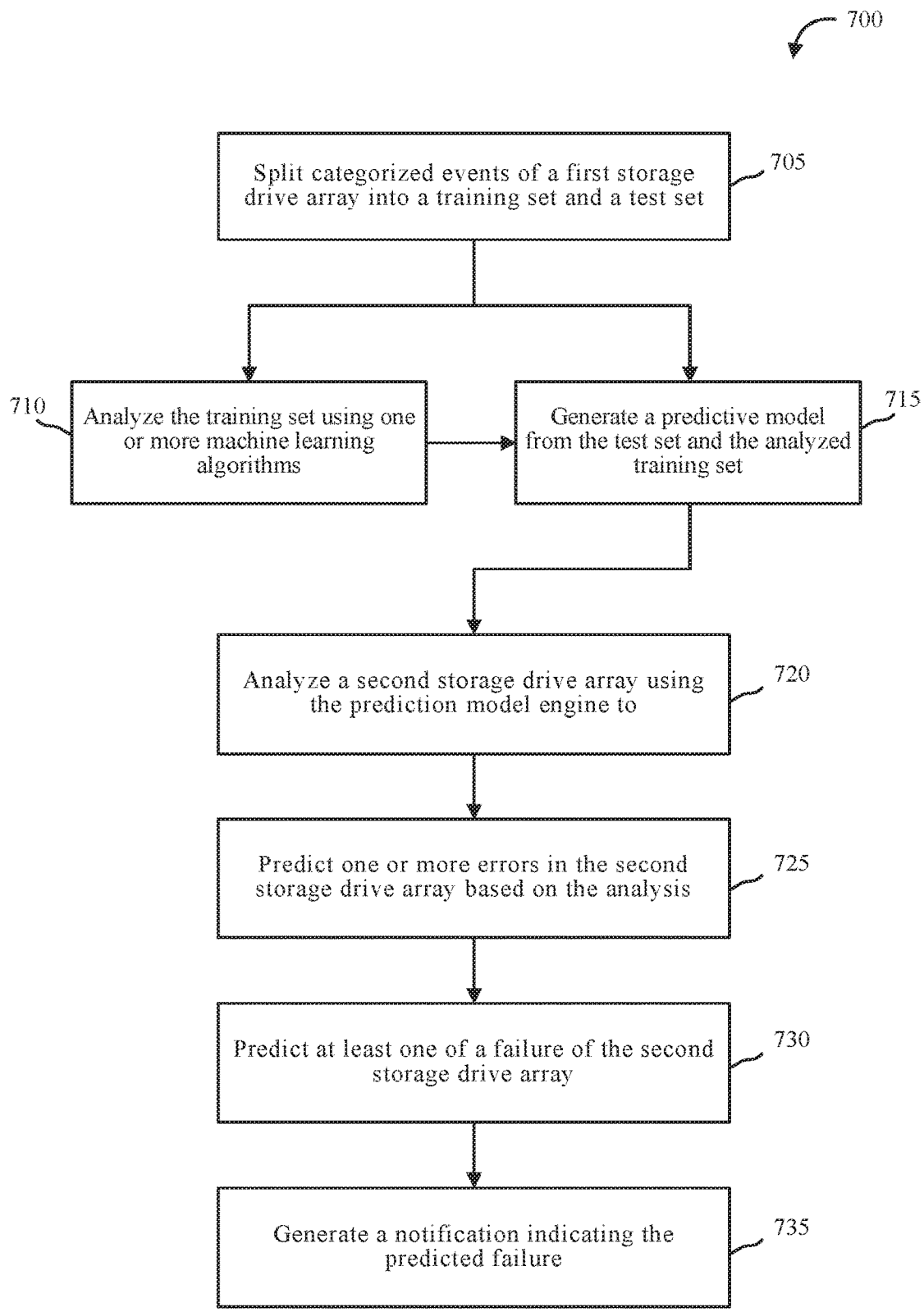
FIG. 7 is a flow chart illustrating an example of a method in accordance with various aspects of this disclosure.

FIG. 7 is a flow chart illustrating an example of a method 700 for machine learning error prediction in storage arrays, in accordance with various aspects of the present disclosure. One or more aspects of the method 700 may be implemented in conjunction with device 105 of FIG. 1, apparatus 205 of FIG. 2, and/or error prediction module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, method 700 may include splitting categorized events of at least a first storage drive array into a training set and a test set. In some cases, the categorized events may be split randomly between the training set and test set. In some cases, the method categorizes events from two or more storage drive arrays, and splits the categorized events from the two or more storage drive arrays into the training set and test set.

At block 710, method 700 may include analyzing the training set using one or more machine learning algorithms including at least one of support vector machine, Bayes Theorem, regression analysis, artificial neural network, or decision tree classifiers, or any combination thereof. At block 715, method 700 may include receiving the analyzed training set and generating a predictive model from the test set received from 705 and the analyzed training set from block 710. In some cases, method 700 may include feeding back learning and/or trained data from block 715 back into block 710.

At block 720, method 700 may include using the prediction model engine to analyze one or more events of a second storage drive array. At block 725, method 700 may include predicting one or more errors in the second storage drive array based at least in part on the analysis of the one or more events of the second storage drive array by the prediction model engine.

At block 730, based at least in part on the analysis of the one or more events of the second storage drive array, method 700 may include predicting at least one of a failure of the second storage drive array, predicting a probable root cause of the predicted failure, or predicting a probable remedy for the predicted failure, or predicting any combination thereof. At block 735, method 700 may include generating a notification indicating the predicted failure. In some cases, the notification may further indicate at least one of the probable root cause of the predicted failure or the probable remedy for the predicted failure, or both.

The operations at blocks 705-735 may be performed using the error prediction module 130 described with reference to FIGS. 1-4 and/or another module. Thus, the method 700 may provide for machine learning error prediction in storage arrays. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A system comprising:
   one or more processors;
   memory in electronic communication with the one or more processors, the memory storing computer executable instructions that when executed by the one or more processors cause the one or more processors to:
   accumulate monitored events into the memory, the monitored events associated with operation of a first storage drive array to transfer data between storage drives in the first storage array and a host device;
   arrange a first portion of the monitored events into a training set and a second portion of the monitored events into a test set;
   analyze the training set of monitored events using machine learning to generate an analyzed training set that identifies at least one failure pattern in the monitored events;
   operate a prediction model engine to predict potential errors in a second storage drive array responsive to an analysis, by the prediction model engine, of the test set of monitored events and the analyzed training set, to feed at least a portion of an output of the prediction model engine back into an input of the training set to provide an updated training set, and to analyze the updated training set using the machine learning.

2. The system of claim 1, wherein the machine learning includes at least one of Support Vector Machines, Bayes Theorem, Regression Analysis, Artificial Neural Network, or Decision Tree Classifiers, or any combination thereof.

3. The system of claim 1, wherein the monitored events are arranged into the respective first and second portions corresponding to the respective training and test sets by at least a selected one of a k-fold cross validation method, a normalization method or a random selection method.

4. The system of claim 1, wherein the instructions executed by the one or more processors cause the one or more processors to perform the steps of:
   subsequently using the prediction model engine to analyze one or more monitored events of the second storage drive array; and
   predicting one or more errors in the second storage drive array based at least in part on the analysis of the one or more monitored events of the second storage drive array.

5. The system of claim 4, wherein the first storage drive array and second storage drive array each include at least one storage enclosure enclosing multiple storage drives.

6. The system of claim 1, wherein the instructions executed by the one or more processors cause the one or more processors to perform the steps of:
   identifying at least one of one or more causes of an identified failure based at least in part on the analysis by the prediction model engine, a remedy for the identified failure based at least in part on the analysis by the prediction model engine, or a pattern of events associated with the identified failure based at least in part on the analysis by the prediction model engine, or any combination thereof.

7. The system of claim 6, wherein an output of the analysis by the prediction model engine includes at least one of the identified failure, the one or more causes of the identified failure, the identified remedy for the identified failure, or the identified pattern of events associated with the identified failure, or any combination thereof.

8. The system of claim 1, wherein the instructions executed by the one or more processors cause the one or more processors to perform the steps of:
   predicting, based at least in part on the analysis by the prediction model engine of one or more monitored events of the second storage drive array, at least one of a failure of the second storage drive array, a probable root cause of the predicted failure, or a probable remedy for the predicted failure, or any combination thereof.

9. The system of claim 8, wherein the instructions executed by the one or more processors cause the one or more processors to perform the steps of:
   generating a notification indicating the predicted failure, wherein the notification further indicates at least one of the probable root cause of the predicted failure or the probable remedy for the predicted failure, or both.

10. The system of claim 1, wherein the identified failure events include at least one of hardware component failures, software code execution failures, data access errors, data read errors, data write errors, or any combination thereof.

11. A method for error prediction in storage systems, the method comprising:
    monitoring events of a first storage drive array during operation of the first storage drive array to transfer user data between storage devices of the first storage drive array and a host device;
    accumulating the monitored events into a computer memory;
    dividing the accumulated monitored events into a respective training set and test set in the computer memory;
    forwarding the training set for analysis by a machine learning circuit to generate an analyzed training set that identifies at least one failure pattern;
    transmitting the analyzed training set and the test set to a prediction model engine circuit to generate a predictive model of behavior of the first storage drive array, the prediction model engine circuit operative to use a portion of an output thereof as an additional input to the training set to provide an updated training set; and
    using the predictive model of behavior from the prediction model engine to predict a potential failure condition for a different, second drive array based on monitored events obtained from the second drive array during operation to transfer user data between storage devices in the second drive array and a host device.

12. The method of claim 11, wherein the machine learning circuit includes at least one of Support Vector Machines, Bayes Theorem, Regression Analysis, Artificial Neural Network, or Decision Tree Classifiers, or any combination thereof.

13. The method of claim 11, further comprising using a k-fold cross validation method to divide the monitored events from the first storage drive array into the respective test and training sets.

14. The method of claim 11, further comprising dividing a first percentage X of the monitored events from the first storage drive array into the test set and a second percentage 100−X into the training set.

15. The method of claim 11, further comprising:
identifying at least one of one or more causes of an identified failure based at least in part on the predictive model, a remedy for the identified failure based at least in part on the predictive model, or a pattern of events associated with the identified failure based at least in part on the predictive model, or any combination thereof.

16. The method of claim 15, wherein an output of the predictive model includes at least one of the identified failure, the one or more causes of the identified failure, the identified remedy for the identified failure, or the identified pattern of events associated with the identified failure, or any combination thereof.

17. The method of claim 11, further comprising providing a notification to a user to take corrective action regarding the second storage drive array responsive to a predicted failure condition from the predictive model using the monitored events from the second storage drive array.

18. A computer-program product for error prediction in storage systems, the computer-program product comprising a non-transitory computer-readable medium storing instructions thereon, the instructions being executable by one or more processors to perform the steps of:
monitoring events of a first storage drive array responsive to transfers of user data between storage drives in the first storage drive array and a host device;
analyzing the monitored events by subjecting a first portion of the monitored events to a machine learning algorithm to detect at least a first performance pattern of the storage drives, by subjecting a different second portion of the monitored events and the detected at least one performance pattern to a prediction model engine to generate an output, and by feeding a portion of the output back to an input of the training set to provide an updated training set to detect at least a second performance pattern of the storage drives; and
using the prediction model engine to predict a potential failure condition in a second storage array responsive to monitored events obtained during user data transfers between second storage drives in the second storage array and a host device.

19. The computer-program product of claim 18, wherein the instructions executed by the one or more processors cause the one or more processors to perform the steps of:
identifying at least one of one or more causes of an identified failure based at least in part on the analysis, a remedy for the identified failure based at least in part on the analysis, or a pattern of events associated with the identified failure based at least in part on the analysis, or any combination thereof.

* * * * *